United States Patent
Eberlein et al.

(10) Patent No.: US 10,762,075 B2
(45) Date of Patent: Sep. 1, 2020

(54) DATABASE INTERFACE AGENT FOR A TENANT-BASED UPGRADE SYSTEM

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 601 days.

(21) Appl. No.: 15/646,690

(22) Filed: Jul. 11, 2017

(65) Prior Publication Data

US 2019/0018874 A1 Jan. 17, 2019

(51) Int. Cl.
| | |
|---|---|
| G06F 16/21 | (2019.01) |
| G06F 16/215 | (2019.01) |
| G06F 16/27 | (2019.01) |
| G06F 16/23 | (2019.01) |
| G06F 8/65 | (2018.01) |

(52) U.S. Cl.
CPC ........ *G06F 16/2365* (2019.01); *G06F 16/211* (2019.01); *G06F 16/215* (2019.01); *G06F 16/2358* (2019.01); *G06F 16/2379* (2019.01); *G06F 16/27* (2019.01); *G06F 8/65* (2013.01)

(58) Field of Classification Search
None
See application file for complete search history.

(56) References Cited

U.S. PATENT DOCUMENTS

| | | | | |
|---|---|---|---|---|
| 9,851,960 | B2 * | 12/2017 | Agostinacchio | .......... G06F 8/61 |
| 2007/0156849 | A1 | 7/2007 | Becker | |
| 2012/0174085 | A1 * | 7/2012 | Driesen | ...................... G06F 8/65 717/168 |
| 2013/0275509 | A1 * | 10/2013 | Micucci | .................. H04L 67/02 709/204 |
| 2018/0246886 | A1 * | 8/2018 | Dragomirescu | ...... G06F 16/214 |

OTHER PUBLICATIONS

"Communication: Extended European Search Report", dated Dec. 13, 2018, European Patent Office, for European Application No. 18180144.0-1224, 16pgs.
Aulbach, Stefan "Schema Flexibility and Data Sharing in Multi-Tenant Databases", Dec. 5, 2011 (Dec. 5, 2011), XP055437285, [retrieved from the Internett: URL:https://mediatium.ub.tum.de/doc/1075044/document.pdf, retrieved on Dec. 21, 2017], 146pgs.

* cited by examiner

*Primary Examiner* — Robert W Beausoliel, Jr.
*Assistant Examiner* — Cheryl M Shechtman
(74) *Attorney, Agent, or Firm* — Buckley, Maschoff & Talwalkar LLC

(57) ABSTRACT

A system may include a shared storage data store containing a first version of entities with original content and a local tenant storage data store to contain information associated with a tenant's application server. A database interface agent may enter a copy-on-access mode and maintain materialization and modification flags. The agent may then initiate an upgrade process during which the first version of the entities are utilized by the application server. The agent may then enter a copy-on-write mode and delete, from the local tenant storage data store, entities having flags that indicate the table was migrated but did not receive customer data. The structure of the remaining entities may then be updated in view of the structure of the second version of the entities. Finally, the content of the entities may be updated in view of the content of the second version of entities and previously received customer data.

20 Claims, 14 Drawing Sheets

DATABASE INTERFACE AGENT FOR A TENANT-BASED UPGRADE SYSTEM

BACKGROUND

The subject matter disclosed herein relates to tenant-based upgrade systems, and, more particularly, to a database interface agent for tenant-based upgrade systems.

Customers may arrange for applications to be executed by a cloud-based application server. For example, an enterprise that services the customers might maintain hardware that executes applications (e.g., to handle human resource tasks, track purchase orders, etc.) in thousands of separate "tenant" spaces (e.g., processing and storage spaces each dedicated to a particular customer). In some cases, relatively large deployments may be available to customers even though many customers will only use a small portion of the deployment (e.g., a customer's deployment might include hundreds of thousands of tables, objects, and other entities—most of which are never actually accessed by that particular customer). Such a situation can result in an unnecessarily large tenant instance footprints, relatively long lifecycle times (since un-used software and persistency may still need to be updated and migrated), a higher consumption of memory, wasted storage costs (including for backup storage), etc. Further note that an upgrade to a deployment may require that changes are made to portions of a deployment that are not used by some tenants.

It would therefore be desirable to provide systems and methods to facilitate tenant-based upgrades in an accurate and efficient fashion.

SUMMARY

According to some embodiments, a system may include a shared storage data store containing a first version of entities with original content and a local tenant storage data store to contain information associated with a tenant's application server. A database interface agent may enter a copy-on-access mode and maintain materialization and modification flags. The agent may then initiate an upgrade process during which the first version of the entities are utilized by the application server. The agent may then enter a copy-on-write mode and delete, from the local tenant storage data store, entities having flags that indicate the table was migrated but did not receive customer data. The structure of the remaining entities may then be updated in view of the structure of the second version of the entities. Finally, the content of the entities may be updated in view of the content of the second version of entitles and previously received customer data.

Some embodiments comprise: means for entering, by a computer processor of a database interface agent, a copy-on-access mode; means for initiating, by the computer processor of the database interface agent, an upgrade process to install a second version of entities from the shared storage data store, wherein a first version of the entities is utilized by the application server during the upgrade process; means for entering, by the computer processor of the database interface agent, a copy-on-write mode; means for deleting, from the local tenant storage data store by the computer processor of the database interface agent, entities having flags that indicate the entity was migrated but did not receive customer data; means for updating, by the computer processor of the database interface agent, the structure of the entities remaining in the local tenant storage data store in view of the structure of the second version of the entities; and means for updating the content of the entities remaining in the local tenant storage data store in view of the content of the second version of entitles and previously received customer data.

Technical advantages of some embodiments disclosed herein include improved systems and methods to facilitate tenant-based upgrades in an accurate and efficient fashion.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Figure 1:
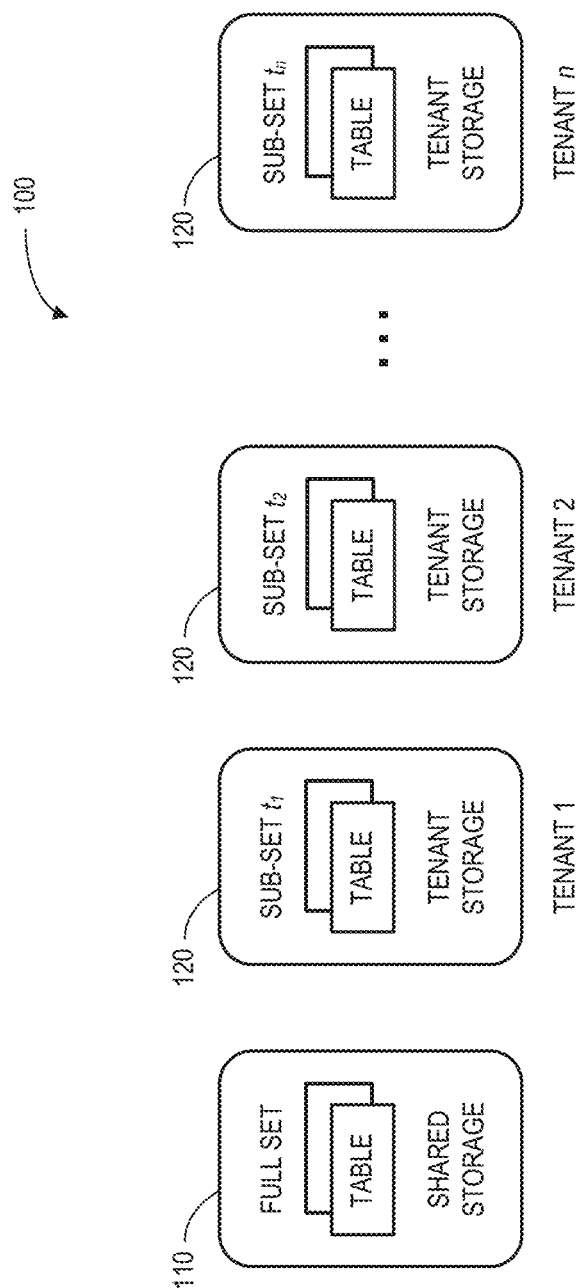
FIG. 1 is a system that may be associated with a tenant-based upgrade.

Software multi-tenancy may refer to a software architecture in which a single instance of software runs on a server and serves multiple tenants. A tenant might be associated with a group of users (e.g., customers of an enterprise) who share a common access with specific privileges to that software instance. With a multi-tenant architecture, a software application may be designed to provide every tenant a dedicated share of an instance —including data, configuration, user management, tenant individual functionality, and non-functional properties. Some embodiments described herein relate to tenant-based upgrades. As used herein, the phrase "tenant-based upgrades" might refer to any software update, patch, new release, etc. FIG. 1 is a system 100 that may be associated with such a tenant-based upgrade. The system includes a shared storage element 110 and a number of tenant storage elements 120 (for tenants 1 through n). As will be described, the shared storage element 110 might contain an entire deployment while each tenant storage 120 contains an appropriate sub-set of that deployment for each customer. The system 100 may have a full set of tables in the shared storage 120 and various sub-sets of those tables ($t_1$ through $t_n$) in each tenant storage 120 materialized in response to specific usage of the system 100 by customers (e.g., in connection with application execution).

Note that a tenant-based deployment might include a substantial number of entities (e.g., tables, objects, etc.) some of which might never be used by a particular customer. According to some embodiments, a system might only "materialize" tables that are actually used (and not all tables). This is, some embodiments might utilize a "minimal deployment" via a "materialization on use" strategy such that a deployment footprint may match the customer's use (and not the entire delivery). Note that having a system split a default shipment (including all tables and functionality) and a tenant with a materialized subset of the default shipment might require adjustments to follow-up lifecycle management events (such as an upgrade). That is, if the adjustments are not made an upgrade might materialize a large part of the system (including everything that is read or written by the upgrade tool—which could be almost everything in the default shipment) and an initial minimal footprint might be replaced with a much larger footprint. Thus, some embodiments described herein may minimize upgrade activities, limiting them to operate only on what is actually materialized (to ensure that the upgrade does not materialize additional tables for no reason). Moreover, according to some embodiments an upgrade process may actually be used to "garbage-collect" some materialized objects to further minimize the local footprint.

Figure 2:
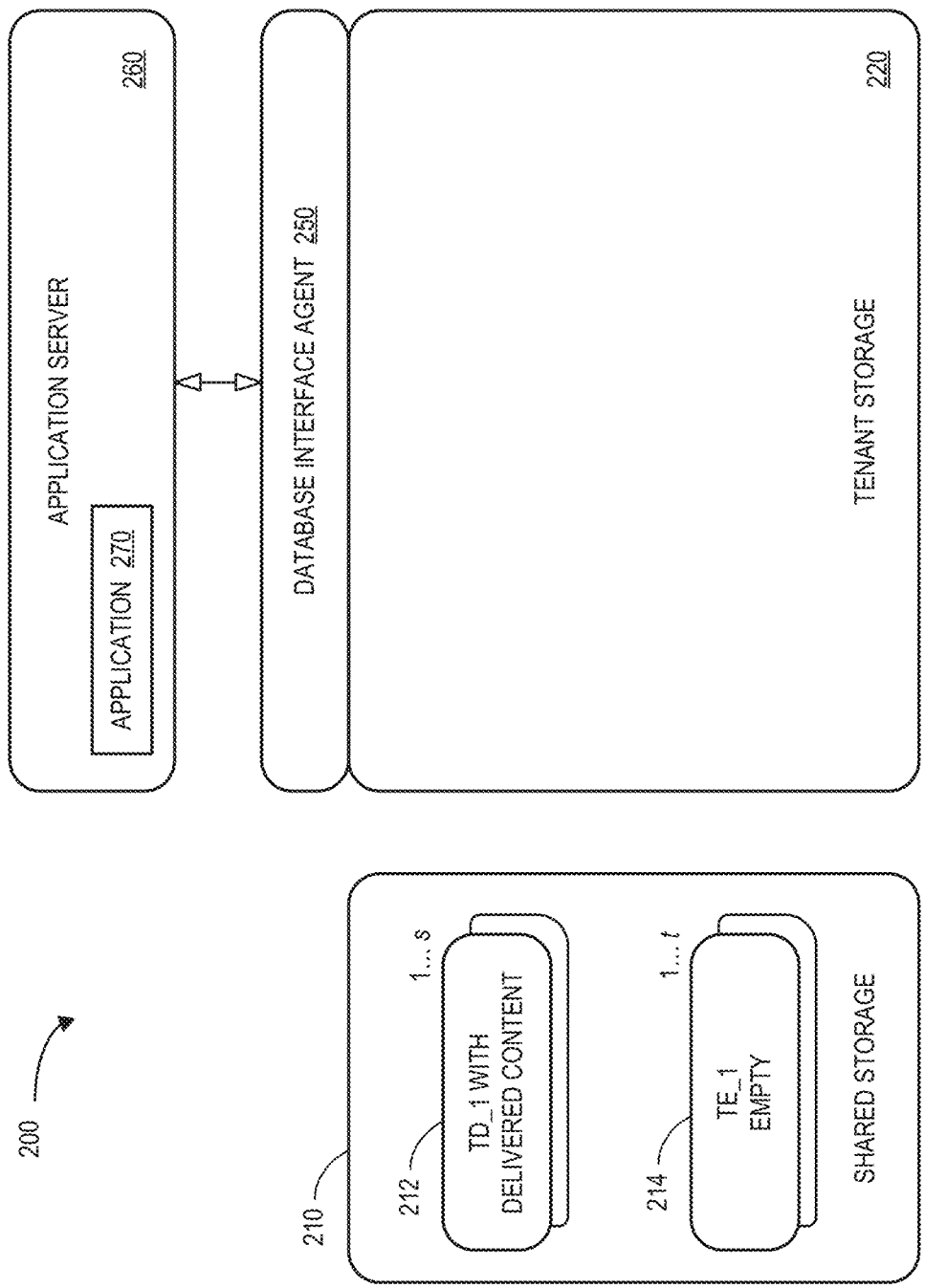
FIG. 2 is a high-level block diagram of a tenant-based upgrade system in accordance with some embodiments.

FIG. 2 is a high-level block diagram of an initial setup for a system 200 according to some embodiments of the present invention. The system 200 includes a database interface agent 250 that may exist between an application server 260 (executing an application 270 for a customer) and a tenant storage element 220. A separate shared storage element 210 might contain an entire employment including tables TD_1 with delivered content 212 (associated with 1 through s), empty tables TE_1 214 (associated with 1 through t), etc. The system 200 may be associated with, for example, an enterprise service cloud-based environment accessed by user devices. The enterprise service cloud may be supported by an enterprise service cloud infrastructure layer (e.g., a private and/or public cloud infrastructure) to provide application 270 services (e.g., native applications, Java cloud applications, portals, mobile device support, collaboration features, integration abilities, etc.) and database services (e.g., in-memory, transactional, analytics, text, predictive, planning, etc.). Note that the database services may support multiple tenants. By way of example only, the system 200 may be associated with a HANA cloud platform from SAP®. Note that various elements of database services may occasionally need to be upgraded to newer versions. For example, a patch may fix an existing problem or a new release may add a new feature. Note that the database interface agent 250 might in some cases be associated with a third party, such as a vendor that performs a service for an enterprise.

The database interface agent 250 might be, for example, associated with a Personal Computer ("PC"), laptop computer, smartphone, an enterprise server, a server farm, and/or a database or similar storage devices. According to some embodiments, an "automated" database interface agent 250 may automatically facilitate a tenant-based upgrade process.

As used herein, the term "automated" may refer to, for example, actions that can be performed with little (or no) intervention by a human.

As used herein, devices, including those associated with the database interface agent 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The database interface agent 250 may store information into and/or retrieve information from the tenant storage 210. The tenant storage 210 may contain data that was downloaded, that was input via an administrator device, that was generated by the application 270 or database interface agent 250, etc. The tenant storage 210 may be locally stored or reside remote from the database interface agent 250. As will be described further below, the tenant storage 210 may be used by the database interface agent 250 during a tenant-based upgrade process. Although a single database interface agent 250 is shown in FIG. 2, any number of such devices may be included. Moreover, various devices described herein might be combined according to embodiments of the present invention. For example, in some embodiments, the database interface agent 250, tenant storage 210, and/or the application server 260 might be co-located and/or may comprise a single apparatus. Further, note that separate versions of the database interface agent 250, tenant storage 210, and/or the application server 260 might exist for each tenant/customer.

Figure 3:
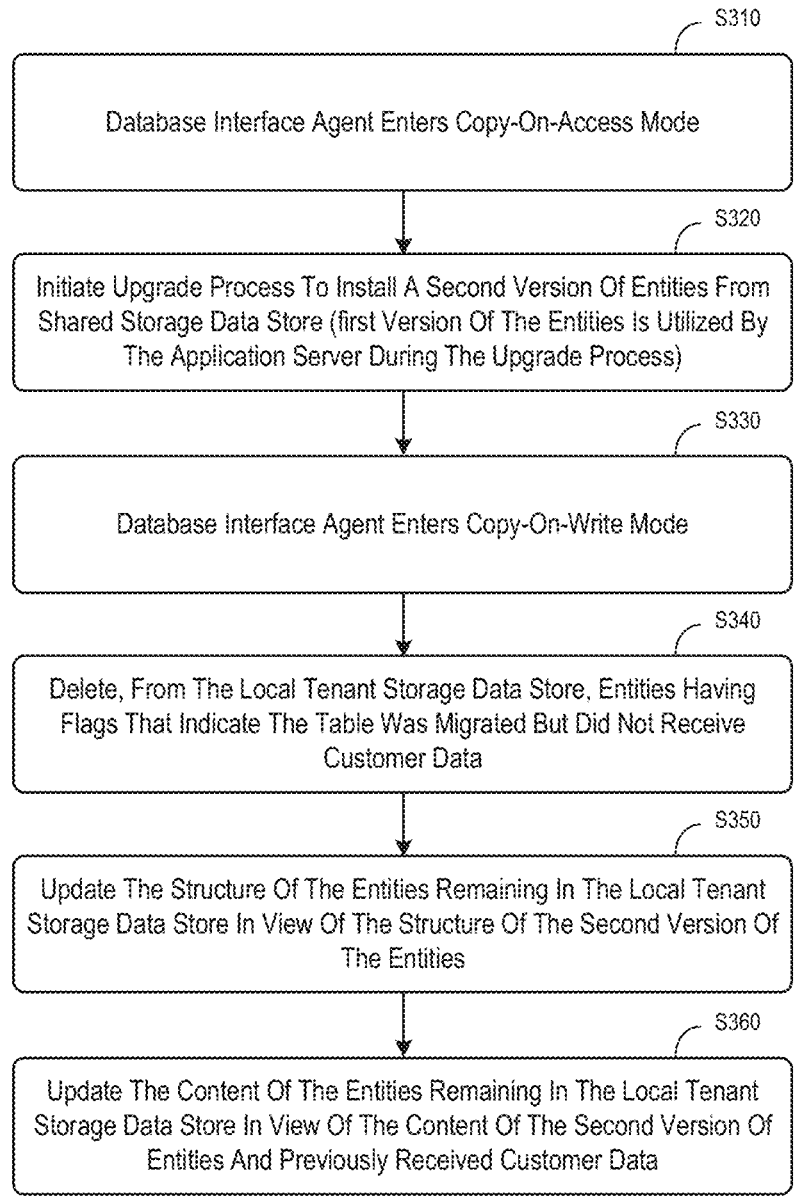
FIG. 3 illustrates a tenant-based upgrade method that might be performed according to some embodiments.

FIG. 3 illustrates a method 300 that might be performed by some or all of the elements of the system 200 described with respect to FIG. 2, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein. The method of FIG. 3 might be associated with, for example, a system having a shared storage data store containing a first version of "entities" with original content and a local tenant storage data store to contain information associated with a tenant's application server. As used herein, the term "entities" might refer to, for example, tables, objects, containers, etc.

At S310, a computer processor of a database interface agent may enter a "copy-on-access" mode. Note that the database interface agent might be implemented as an integral part of a database. According to other embodiments, the database interface agent comprises a separate component associated with the application server. In that case, the database interface agent might detect an error message when a statement attempts to access an entity that is missing from the local tenant storage data store, roll back execution, analyze the error message looking for the missing entity, copy the missing entity into the local tenant storage data store, and re-execute the statement.

During the "copy-on-access" mode, as an application server accesses a sub-set of the first version of entities, the sub-set is migrated from the shared storage data store to the local tenant storage data store. As used herein, the term "access" might refer to, for example, a read operation or a write operation. Moreover, associated materialization flags may be maintained indicating that the sub-set has been migrated. As the application server writes customer data into some of the sub-set of the first version of entities, modification flags may be maintained indicating that those entities have received customer data. Note that an entity in the local tenant storage data store may receive customer data an insert operation, delete operation, or an update operation.

At S320, the database interface agent may initiate an upgrade process to install a second version of entities from the shared storage data store. Note that the first version of the entities may still utilized by the application server during the upgrade process. At S330, the database interface agent may enter a "copy-on-write" mode. During the "copy-on-write" mode, as the application server accesses an additional sub-set of the first version of entities, the addition sub-set is not migrated from the shared storage data store to the local tenant storage data store. As a result, the associated materialization flags are not maintained. As the application server writes customer data into some of the first version of entities, modification flags may maintained indicating that those entities have received customer data.

At S340, the database interface agent may delete, from the local tenant storage data, entities having flags that indicate the entity was migrated but did not receive customer data. At S350, the database interface agent may update the structure of the entities remaining in the local tenant storage data store in view of the structure of the second version of the entities. Similarly, at S360 the database interface agent may update the content of the entities remaining in the local tenant storage data store in view of the content of the second version of entitles and previously received customer data to complete the upgrade process.

According to some embodiments, upon completion of the upgrade process the database interface agent may arrange for the application server to utilize the second version of entities. Moreover, according to some embodiments, upon initiation of the upgrade process, the database interface agent may analyze the entities to determine which entities need to be upgraded. As part of completion of the upgrade process, the database interface agent may compare content of entities modified during the upgrade process with the second version of the entities and, if the content is identical, delete the entity from the local tenant storage data store.

Thus, some embodiments may utilize a shared repository and local materialization of objects and modify content of materialized objects. Moreover, the system may "apply upgrade logic" to materialized objects (since it is not sufficient to re-materialize the new, as that would lose any customer modifications to the object persistency). Note that data might be materialized locally (instead of using remote access). Consider, for example, a single default deployment where the default data is not available on every host where a tenant is deployed. This might require remote access to default content, which could be associated with a performance penalty. Such a penalty might be acceptable for a single record access (e.g., during usage of tables in joins the database may implicitly copy the data to the local database for executing the join and delete the cache after the execution). For frequent joins, however, such an approach is not efficient. Moreover, if system persistency is not fully "content separated" (into tables for delivery and local tables for tenant content), tables might include both delivered content and tenant content. Thus, according to some embodiments tables may be materialized with default content and after that tenant content may be added.

According to some embodiments, not all of an application's tables will be deployed to a tenant database upon initial provisioning of the tenant. Instead, the application starts with an empty tenant database, connected to the default database (that contains all of the tables, database objects, and table content). Database objects (such as table) are then "materialized" when the object is first accessed (read or write). This might be done, for example, with a single database statement such "create table TD_1 like default.TD_1 with data." Note that if the statement executed against the database uses more than one object, all of the required objects may need to be created (this might comprise views and procedures and/or iterative operations for tables read in where clauses, etc.). Once materialized, the content of the database tables can be modified by the user (via the application).

Figure 4:
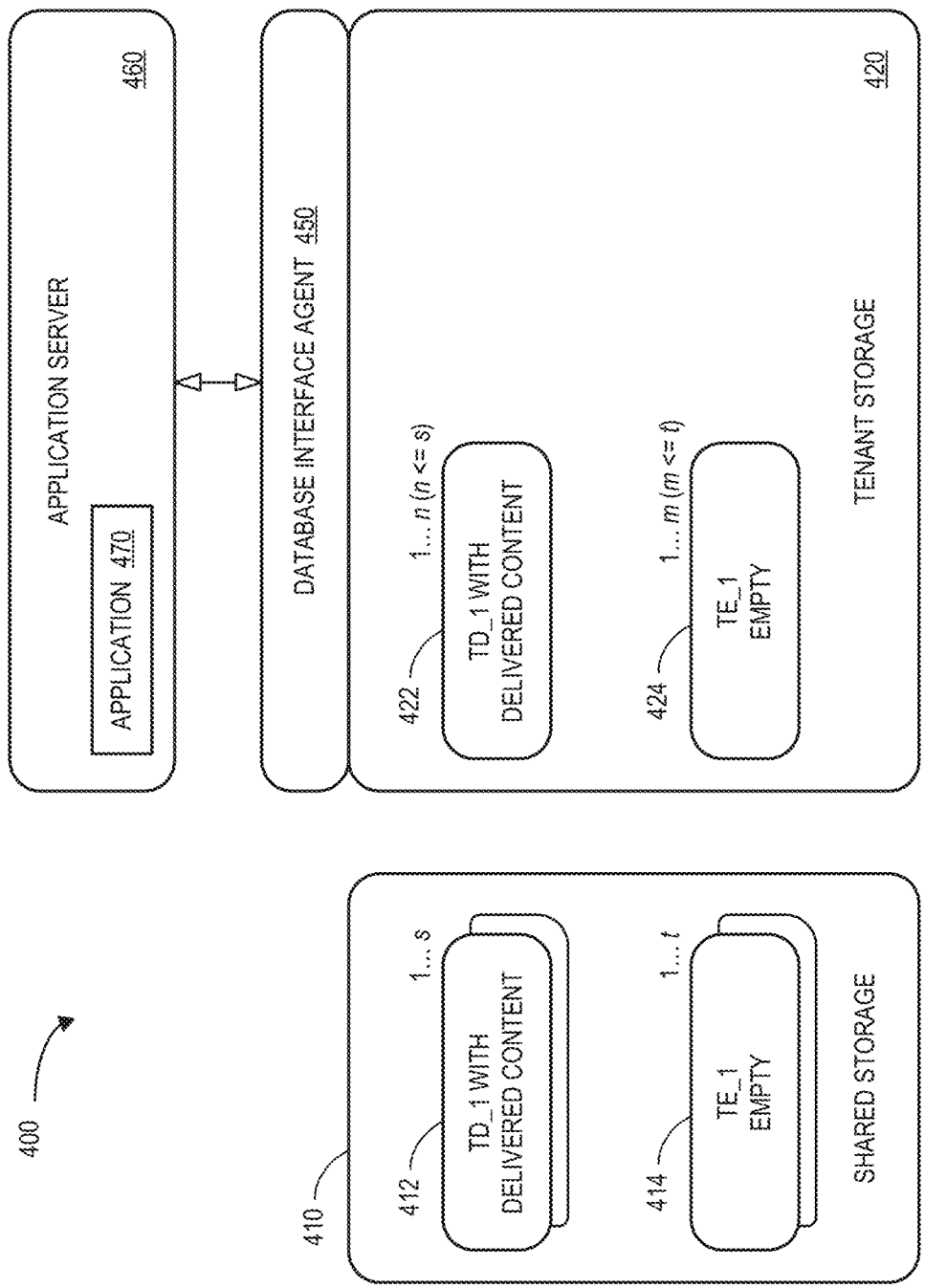
FIG. 4 is an example of a system after an application has read from some entities in accordance with some embodiments.

FIG. 2 illustrated an initial system 200 with a shared storage 410 and one tenant storage 220. During execution, the application 270 may read some objects and FIG. 4 is an example of a system 400 after an application 460 at an application server 460 has read from some entities in accordance with some embodiments. In particular, a sub-set of the tables TD_1 with delivered content 412 have been copied from shared storage 410 to TD_1 with delivered content 422 in tenant storage 420. Note that the sub-set of tables (1 . . . n) will represent fewer tables (i.e., those that have been accessed) as compared to the original set of tables (1 . . . s). Similarly, a sub-set of the empty tables TE_1 empty 414 have been copied from shared storage 420 to TE_1 empty 424 in tenant storage 420. Note that the sub-set of empty tables (1 . . . m) will represent fewer tables (i.e., those that have been accessed) as compared to the original set of empty tables (1 . . . t). That is, the accessed tables 422, 424 have been created locally such that, for an empty table, the local table is empty as well. For a table that contains data in the shared storage 410, the table is created with data locally in the tenant storage 420.

According to some embodiments, the database interface agent 450 may, upon a selection, create a table as select * from shared_storage.Tx and repeat statement. For example, this might be performed via a database interface where a Structured Query Language ("SQL") error is caught for missing objects (and those objects can then be created). A similar approach could be taken for tables, views, procedures, etc. In another approach, this might be implemented as database function, before the access, to check for the existence of an entity and perform a copy if needed.

Figure 5:
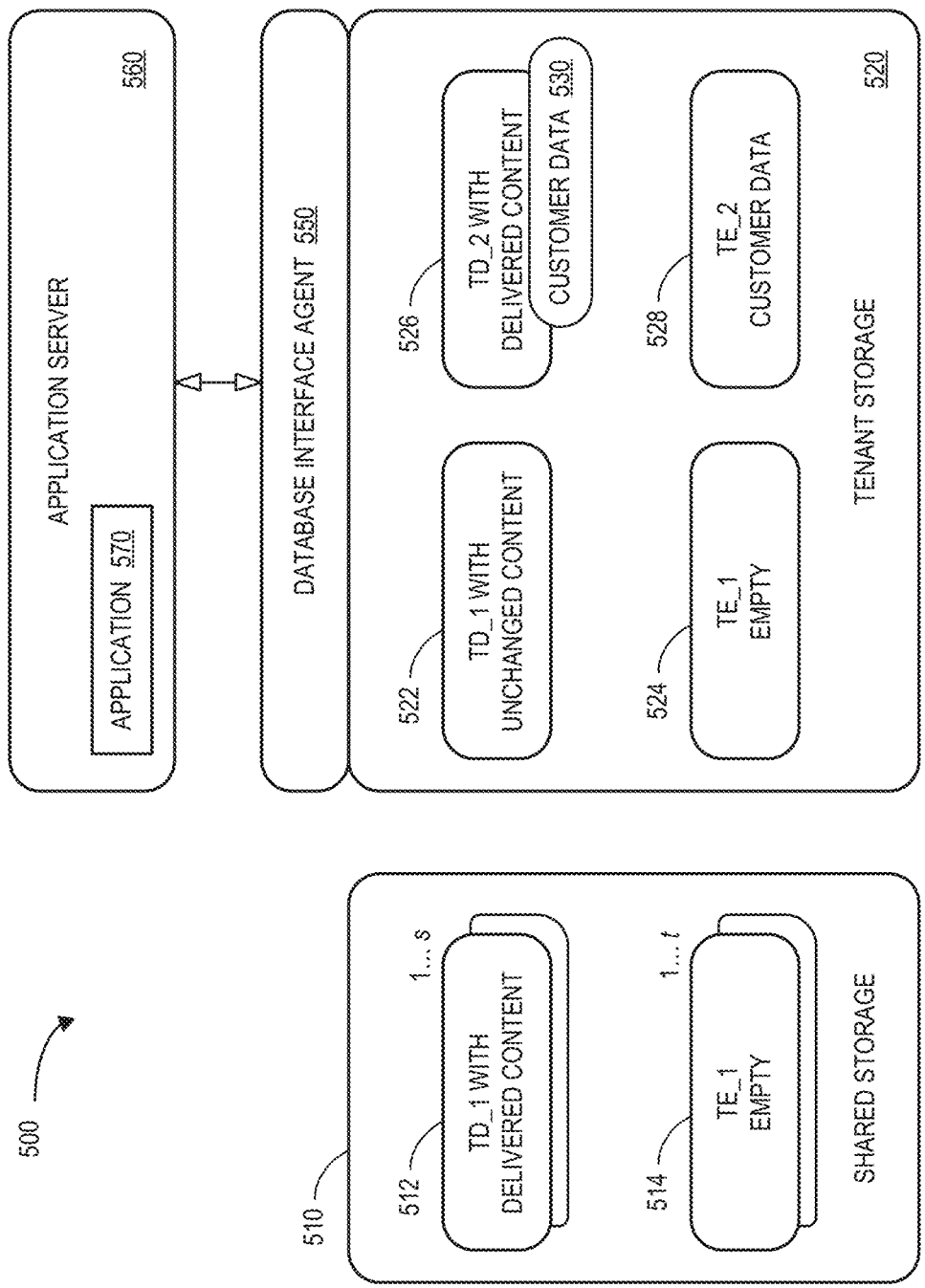
FIG. 5 is an example of a system after an application has written to some entities according to some embodiments.

To facilitate administration of the tenant database, some embodiments may keep track of the copied tables and objects and store a "materialized" flag (e.g., any type of indication) for each of those objects. As the application 470 continues to execute, information may be written data to some tables. FIG. 5 is an example of a system 500 after an application has written to some entities according to some embodiments. As before, a sub-set of the tables TD_1 with delivered content 512 were copied from shared storage 510 to TD_1 with delivered content 522 in tenant storage 520. Similarly, a sub-set of the empty tables TE_1 empty 514 have been copied from shared storage 520 to TE_1 empty 524 in tenant storage 520. Note that the formerly empty tables 524 can now have customer data TE_2 customer data 528 and tables with default or unchanged content 522 copied from the shared storage 510 now have both delivered data 526 and customer data 530. To facilitate administration of the tenant database, some embodiments keep track of the tables have received write operations (e.g., insert, delete, or update) by storing a "modified" flag for each of those tables.

The materialization of the database objects may lead to a follow-up problem upon executing an application upgrade on tenant systems. Whereas the shared/default container can be replaced by a container with the new content, for each tenant the materialized objects may be adjusted as follows:
- materialized objects may be adjusted (e.g., both the structure and content might be adjusted),
- obsolete objects may be deleted, and
- new objects might not be created in the tenant, but may instead be created upon first access.

Figure 6:
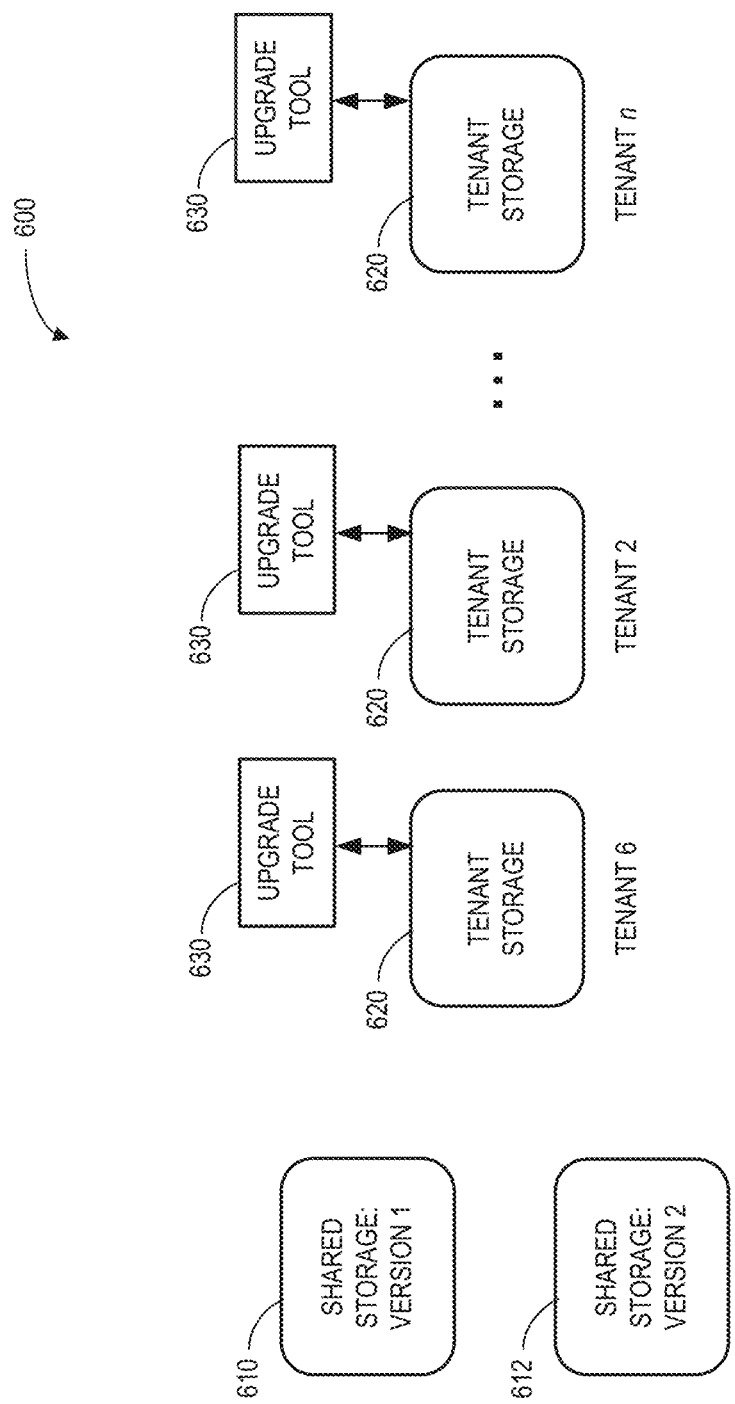
FIG. 6 is an example of a system executing an upgrade procedure in accordance with some embodiments.

FIG. 6 is an example of a system 600 executing an upgrade procedure in accordance with some embodiments. In particular, a first version of a deployment in shared storage 610 is being replaced by a second version of the deployment 612 in each tenant storage 620 via an upgrade tool 630. That is, a new version of the shared container is provided as the upgrade tool executes for each tenant. Note that during an upgrade: (1) the system 600 may use the first version 610 during the data migration procedure, (2) table structures may be adjusted of materialized tables, (3) content may be deployed to materialized tables, (4) the data migration may be run on materialized tables, and (5) the system 600 may switch to the second version 612.

The adjustment of a materialized object might be associated with, for example, a "drop/create" for all objects without persistency (e.g., procedures and views). According to some embodiments, the adjustment of a database table might be associated with:
- an adjustment of the structure to the target definition,
- a deployment of new data/update of formerly deployed data, and
- migration of content in the table to match the new application version.

Note that during an upgrade, tables may be adjusted to a new structure. For example, a prior structure having a "First Name" field and a "Last Name" field might be adjusted to a single "First and Last Name" field. When the structure is adjusted, the operation may be ignored if the table has not been copied to the tenant schema (the new shared schema can be used instead. If, on the other hand, the table has already been copied (and the content has been potentially modified, the system may adjust the structure of the table.

Similarly, during an upgrade, tables may have to be updated with new content. When the content is updated, the operation may be ignored if the table has not been copied to the tenant schema (the new shared schema may be used instead). If, on the other hand, the table has already been copied (and the content has been potentially modified, the system may adjust the content of the table and/or deploy new content.

If a program needs to be executed during an upgrade to migrate content of an application, the migration might need to run depending on the state of the table. Note that different approaches might be associated with migrating content for a single table as compared to migrating content for multiple tables. In the case of modifying a single table, if the table has not been copied to the tenant schema the operation may be ignored (and the system may use the new shared schema instead). If the table has already been copied (and the content has been potentially modified, the system may migrate the content of the table and/or deploy new content.

When content needs to be migrated for multiple tables, the system may determine if any of the tables have been materialized to the local schema. If no table has been copied to the local tenant schema, the system may ignore if the operation. If at least one of the tables has been copied, a migration program may be executed in connection with the database interface agent using either a "brute force" or "resource minimization" approach. In the brute force approach, the migration program could be run and accessing the database via the database interface agent. The migration program can then (implicitly) copy every accessed table, even if the table has not been materialized before the migration program execution upon first access. The migration program can then modify content of all written tables whether or not the table has been materialized before the migration program execution. Note that this may result in longer runtime of the migration programs and—as it materializes more tables to the tenant than had been materialized during use—may also increase the storage and memory footprint of the tenant schema.

To avoid such problems, the resource minimization approach may, before the migration program is started (or as a first step of the upgrade), analyze the tables with respect to content modification. The process might then: (1) delete all tables which had been materialized but had not been modified. (these tables will be copied in a new version from the new default schema upon execution of the application after the upgrade if a program needs to be executed during the upgrade to migrate content of an application, the migration might need to run depending on the state of the table, (2) ignore all migration programs that execute only on unmodified tables, and (3) execute all remaining migration programs.

When the remaining migration programs are executed, the database interface agent may be switched from "copy-on-access" mode to "copy-on-write" mode. Moreover, tables that are only read are read from the default schema for the migration program (and are not copied). Tables that are modified by the migration program may be copied to the tenant schema (if they had not been present). After the migration program completes execution, the system may compare the content of the tables modified by the migration program with the content of the table of the new default schema. If the content is the same, the table can be deleted.

Figure 7:
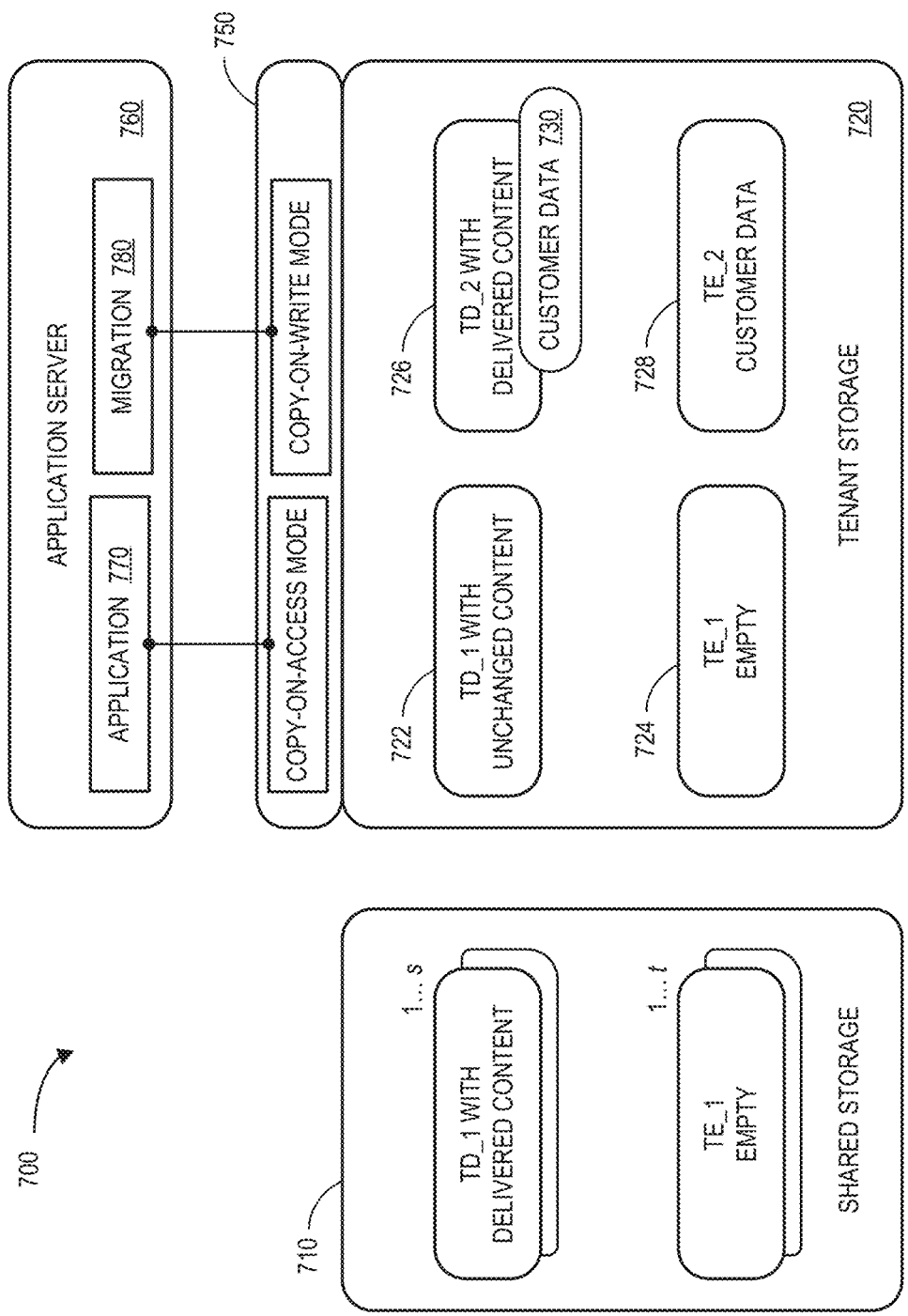
FIG. 7 is an example of a system beginning an upgrade process in accordance with some embodiments.

Thus, some embodiments may be implemented as follows. Initially, materialized but un-modified tables may be dropped (possibly with the exception of tables being read in migration programs). As a result, they do not have to be adjusted and can be materialized from the target release shared container again. For example, FIG. 7 illustrates a system 700 beginning an upgrade process in accordance with some embodiments. As before, a sub-set of the tables TD_1 with delivered content were copied from shared storage 710 to TD_1 with delivered content 722 in tenant storage 720. Similarly, a sub-set of the empty tables TE_1 empty 714 have been copied from shared storage 720 to TE_1 empty 724 in tenant storage 720. Note that the formerly empty tables 724 can now have customer data TE_2 customer data 728 and tables with default or unchanged content 722 copied from the shared storage 710 now have both delivered data 726 and customer data 730. Upon upgrade of the tenant, the system 700 may remove materialized objects which had not been modified (TD_1 with unchanged content 722 and TE_1 empty 724 may be deleted). Note that the application 770 in an application server 760 may interact with the database interface agent 750 via a "copy-on-access" mode while a migration program 780 interacts with a "copy-on-write" mode.

Figure 8:
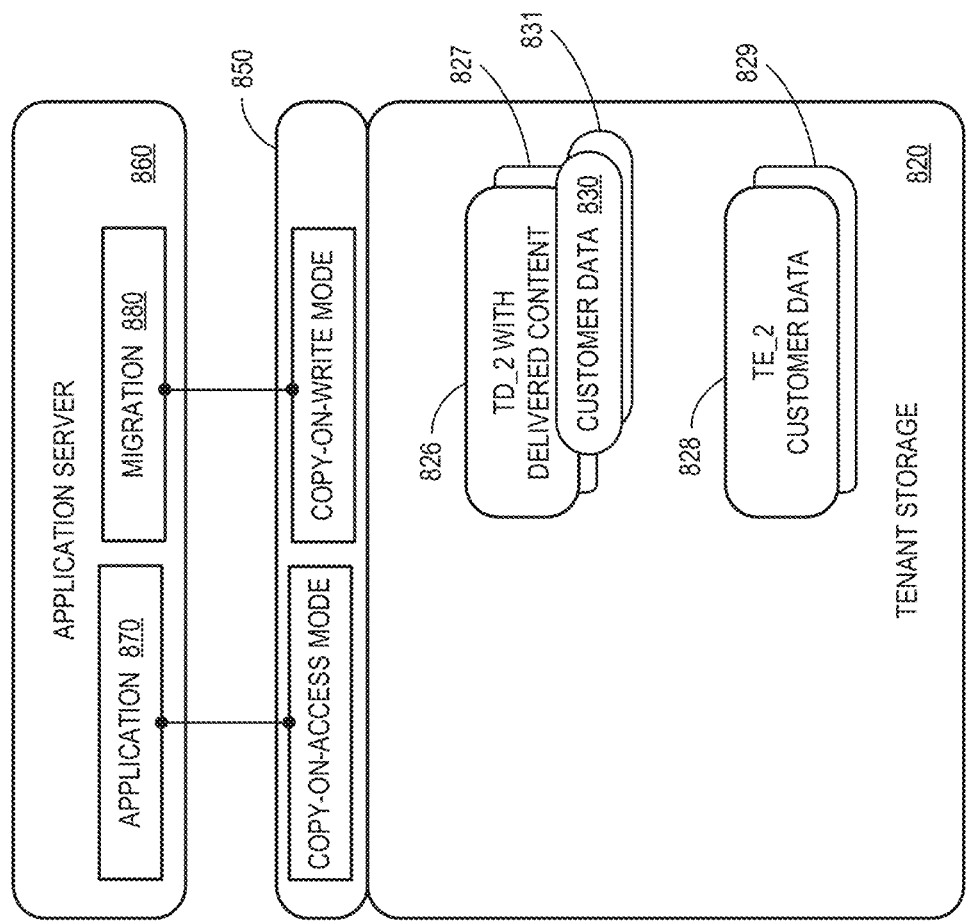
FIG. 8 is an example of a system adjusting entity structure and content according to some embodiments.
Figure 8:
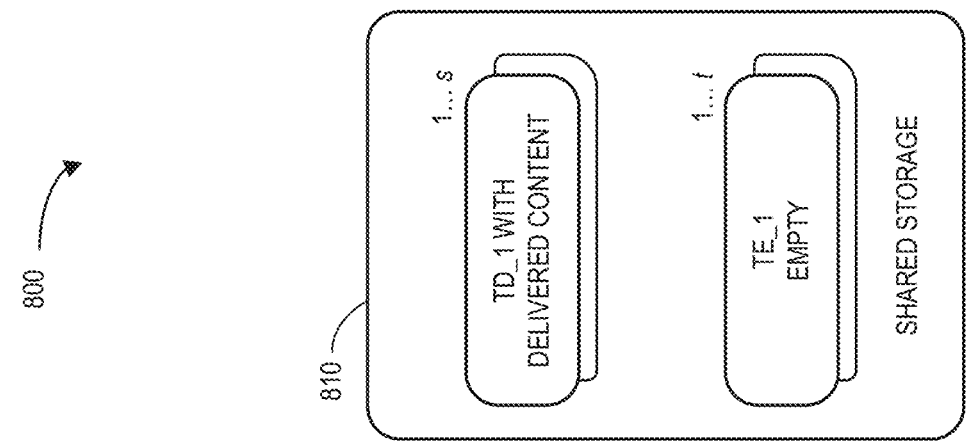

Next, the structure and content of the materialized and modified tables may be adjusted from a first version to a second version. FIG. 8 is an example of a system 800 adjusting entity structure and content according to some embodiments. A sub-set of the tables TD_1 with delivered content were copied from shared storage 810 to tenant storage 820 and modified by the customer. Similarly, a sub-set of the empty tables TE_1 empty 814 have been copied from shared storage 820 to tenant storage 820 and have been populated by the customer and now have customer data TE_2 customer data 828 (and now have both delivered data 826 and customer data 830). The application 870 in an application server 860 may interact with the database interface agent 850 via a "copy-on-access" mode while a migration program 880 interacts with a "copy-on-write" mode. At this stage, the tables 826 might now have the second version of the delivered content and structure while the customer data 830 has the second version of the structure and the first version of the content. Similarly, the empty tables 828 may have the second version of the structure and the first version of the content.

Figure 9:
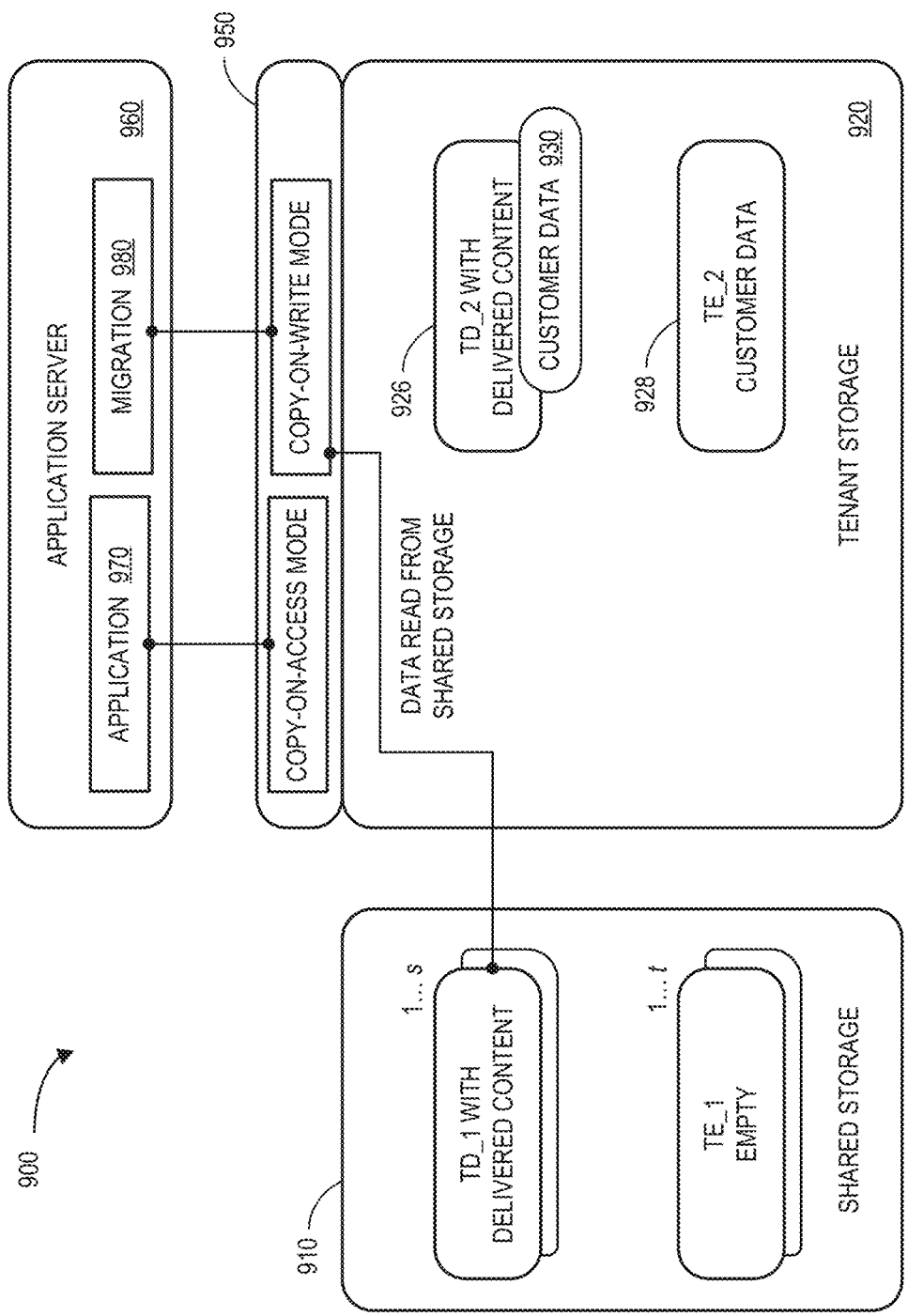
FIG. 9 is an example of a system executing a migration process in accordance with some embodiments.
Figure 10:
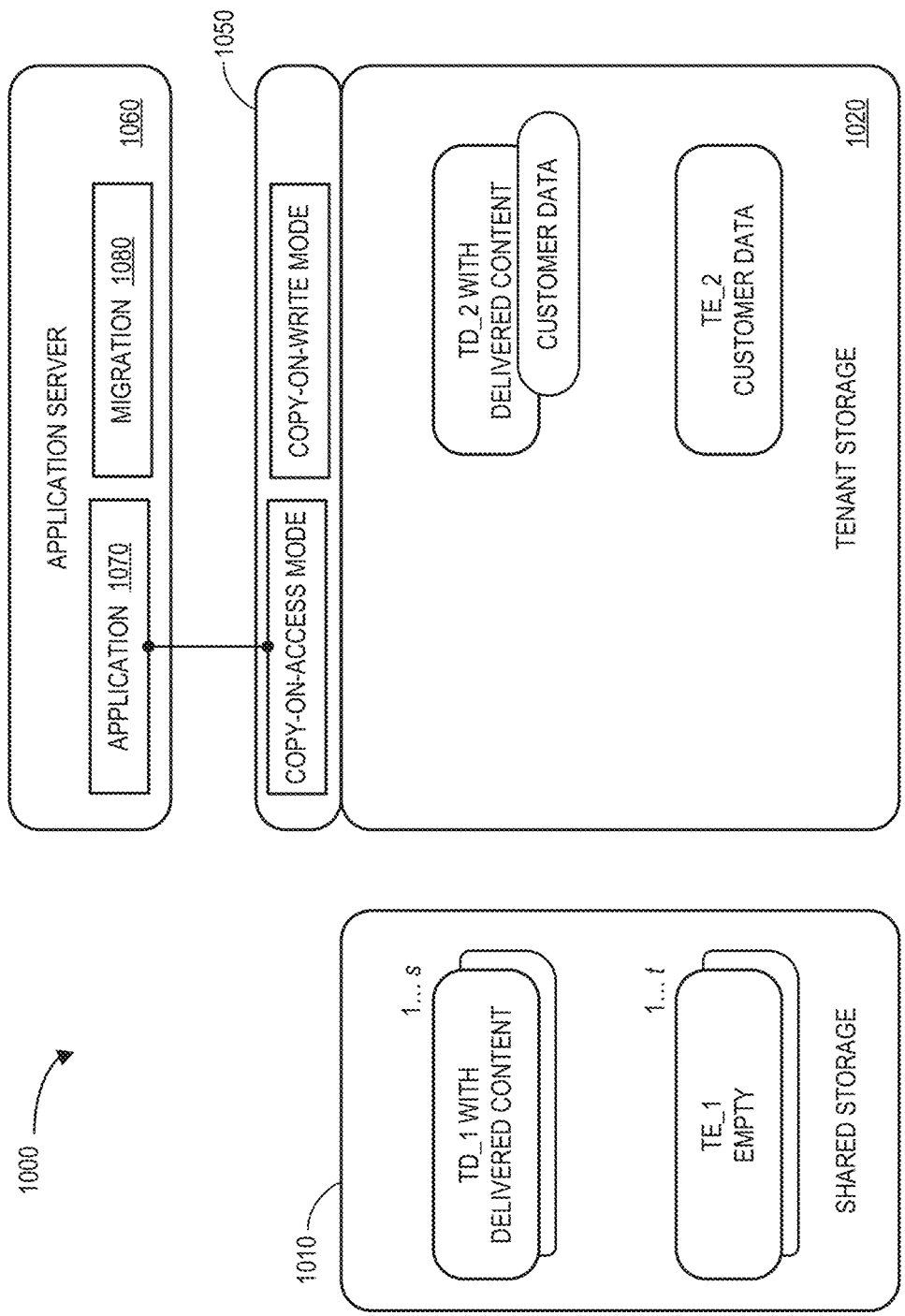
FIG. 10 is an example of a system after the upgrade process is complete according to some embodiments.

After the structure and content are adjusted, the data migration may be executed (using copy-on-write mode instead of copy-on-access mode). FIG. 9 is an example of a system 900 executing a migration process in accordance with some embodiments. A sub-set of the tables TD_1 with delivered content were copied from shared storage 910 to tenant storage 920 and modified by the customer. Similarly, a sub-set of the empty tables TE_1 empty 914 have been copied from shared storage 920 to tenant storage 920 and have been populated by the customer and now have customer data TE_2 customer data 928 (and now have both delivered data 926 and customer data 930). The application 970 in an application server 960 may interact with the database interface agent 950 via a "copy-on-access" mode while a migration program 980 interacts with a "copy-on-write" mode. At this stage, migration may be complete and the tables 926 and customer data 930 all have the second version of structure and content. Likewise, the empty tables 928 have the second version of structure and content. After execution of the data migration, the materialized tables content can be compared with the target release shared storage table content. Tables with identical content can be may be deleted. FIG. 10 is an example of a system 1000 after the upgrade process is complete including shared storage 1010 and tenant storage 1020. Now that the upgrade is complete, the database interface agent 1050 only needs to interact with the "copy-on-access" mode of the application 1070 in the application server 1060 (the migration program 1080 has finished executing).

Note that a database interface agent may create the tables and copy the data from default schema to tenant schema upon access and modification. The database interface agent may also maintain materialization and modification flags for each table. Note that such a component might be created as an integral part of the database. If so, requests to the database may be analyzed before execution during the parsing and preparing the statements to determine if the objects to be accessed are locally available (or not available). Objects not yet available may be created by copying from the default container.

In other cases, the database interface agent might comprise a separate component (e.g., similar to a "database interface" of an application server). If so, the database interface may execute the statements against the database. When an object is missing, the database may return an error message. The execution may be rolled back, the error message may be analyzed for the missing object, and the object may be copied from the default container. The statement may then be repeated in an iterative fashion until the operation is successful.

For every table that is copied to the local tenant schema, a materialization flag and modification flag may be maintained to facilitate access. According to some embodiments, the system may instead look up a database catalog. When a modify statement is executed for a table, the database interface agent may store an indication that the content is no longer the content of the table in the default schema.

According to some embodiments, un-modified tables may be deleted after the migration program is executed and the migration program may be executed only on modified entities (not on materialized entities). As a result, the migration program may run on local data (which is already there). In some embodiments, object dependency graphs can be analyzed on the default schema. If, for example a view is accessed in the tenant, the view is not present and shall be created, the create statement may generate an error message if the selected tables are not present. As a result, the used objects may be determined on the default schema and be created in the default schema in the correct sequence (building from objects that do not depend on other objects towards objects that use other objects).

Figure 11:
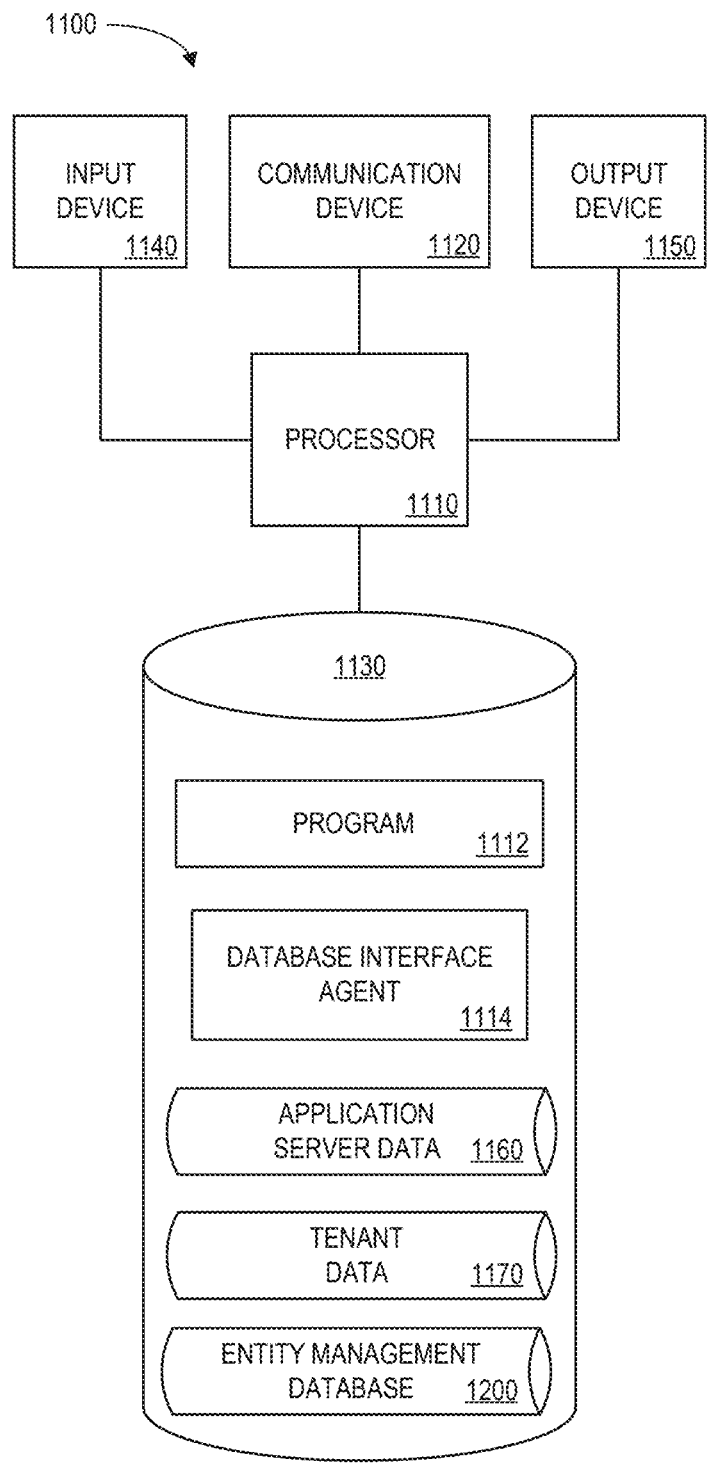
FIG. 11 illustrates a database interface agent platform in accordance with some embodiments.

The embodiments described herein may be implemented using any number of different hardware configurations. For example, FIG. 11 is block diagram of a database interface agent platform 1100 that may be, for example, associated with the system 200 of FIG. 2. The database interface agent platform 1100 comprises a processor 1110, such as one or more commercially available Central Processing Units ("CPUs") in the form of microprocessors, coupled to a communication device 1112 configured to communicate via a communication network (not shown in FIG. 11). The communication device 1112 may be used to communicate, for example, with an application server, tenant storage, shared storage, client devices, etc. The database interface agent platform 1100 further includes an input device 1140 (e.g., a computer mouse and/or keyboard to input upgrade and migration information, etc.) and/an output device 1150 (e.g., a computer monitor to render a user interface display, transmit alert messages, generate statistics for reports, etc.). According to some embodiments, a mobile device and/or PC may be used to exchange information with the database interface agent platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a database interface agent 1114 for controlling the processor 1110. The processor 1110 performs instructions of the programs 1112, 1114, and thereby operates in accordance with any of the embodiments described herein. For example, the processor 1110 may enter a copy-on-access mode and maintain materialization and modification flags. The processor 1110 may then initiate an upgrade process during which the first version of the entities are utilized by the application server. The processor 1110 may then enter a copy-on-write mode and delete, from the local tenant storage data store, entities having flags that indicate the table was migrated but did not receive customer data. The structure of the remaining entities may then be updated by the processor 1110 in view of the structure of the second version of the entities. Finally, the content of the entities may be updated by the processor 1110 in view of the content of the second version of entities and previously received customer data.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the monitoring and control platform 1100 from another device; or (ii) a software application or module within the database interface agent platform 1100 from another software application, module, or any other source.

In some embodiments (such as the one shown in FIG. 11), the storage device 1130 further stores application server data 1160, tenant data 1170, and an entity management database 1200. An example of a database that may be used in connection with the database interface agent platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
FIG. 12 is a tabular portion of an entity management database according to some embodiments.

Referring to FIG. 12, a table is shown that represents the entity management database 1200 that may be stored at the database interface agent platform 1100 according to some embodiments. The table may include, for example, entries associated with an upgrade process in accordance with any of the embodiments described herein. The table may also define fields 1202, 1204, 1206, 1208, 1210, 1212, 1214 for each of the entries. The fields 1202, 1204, 1206, 1208, 1210, 1212, 1214 may, according to some embodiments, specify: an entity identifier 1202, a tenant identifier 1204, an application identifier 1206, a materialization flag 1208, a modification flag 1210, and an upgrade status 1212. The entity management database 1200 may be created and updated, for example, by a database interface agent.

The entity identifier 1202 may be, for example, a unique alphanumeric code identifying an entity in a deployment such as a table, an object, a container, etc. The tenant identifier 1204 might indicate a tenant or customer associated with the entity, and the application identifier 1206 might indicate an application program or server that utilizes the entity. The materialization flag 1208 might indicate if the entity is locally stored in tenant storage. The modification flag 1210 might indicate whether or not the application has written to the entity. The upgrade status 1212 might indicate that the upgrade for the entity is complete, pending, skipped (e.g., when an entity is neither materialized or modified as indicated by the materialization flag 1208 and modification flag 1210), etc.

Thus, some embodiments may provide systems and methods to facilitate tenant-based upgrades in an accurate and efficient fashion. Moreover, embodiments may reduce a database's footprint down to only the used application and the used objects. In the case of especially large applications, customer usage may be limited to only a fraction of the available scope. Some embodiments may then optimize the upgrade of an application working with "copy-on-access" to reduce operations to materialized tables (and also clean up the system to further reduce the footprint).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments use particular upgrade illustrations as examples, other types of upgrades could be processed instead.

Figure 13:
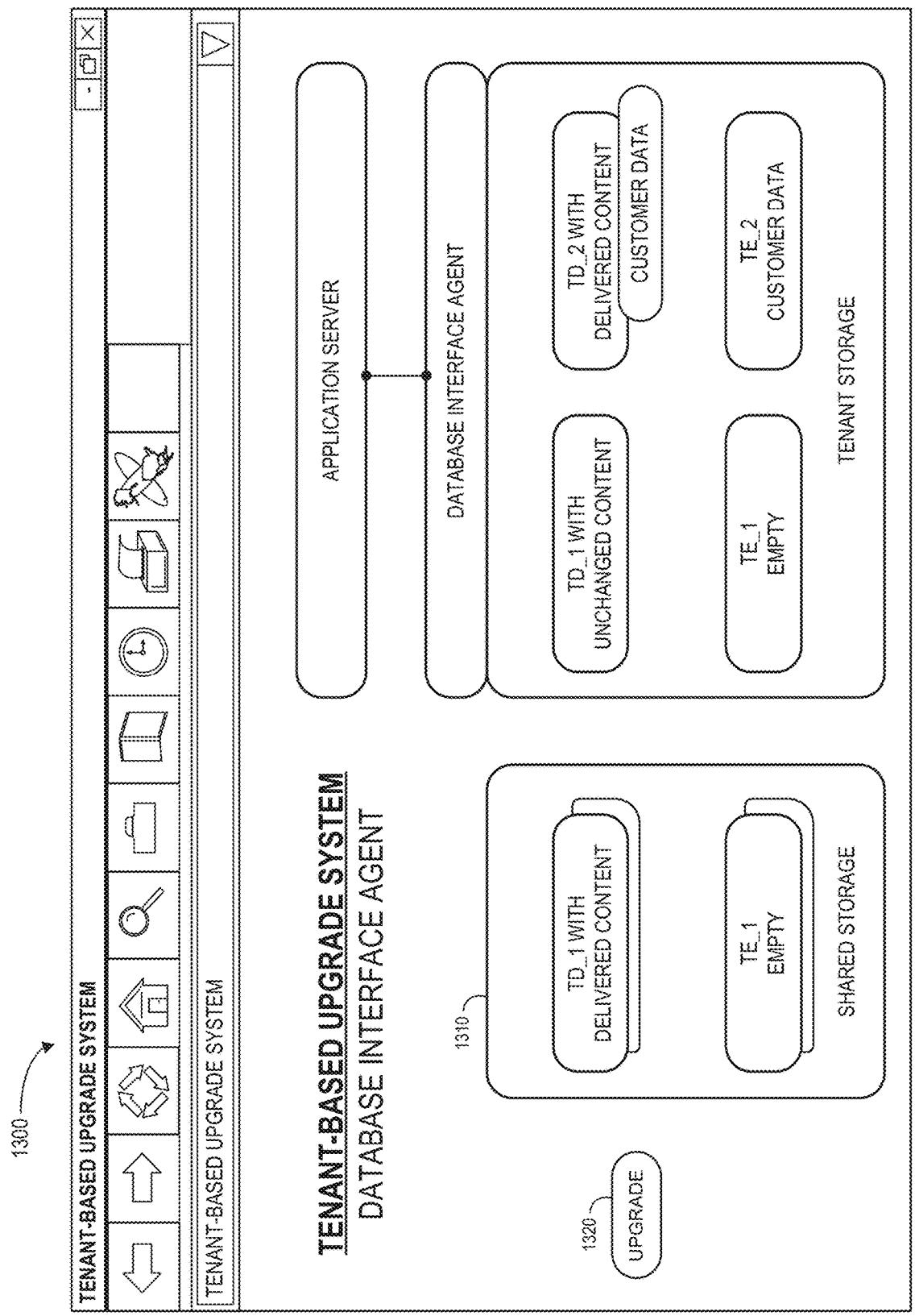
FIG. 13 illustrates a computer displaying an interactive graphical user interface according to some embodiments.
Figure 14:
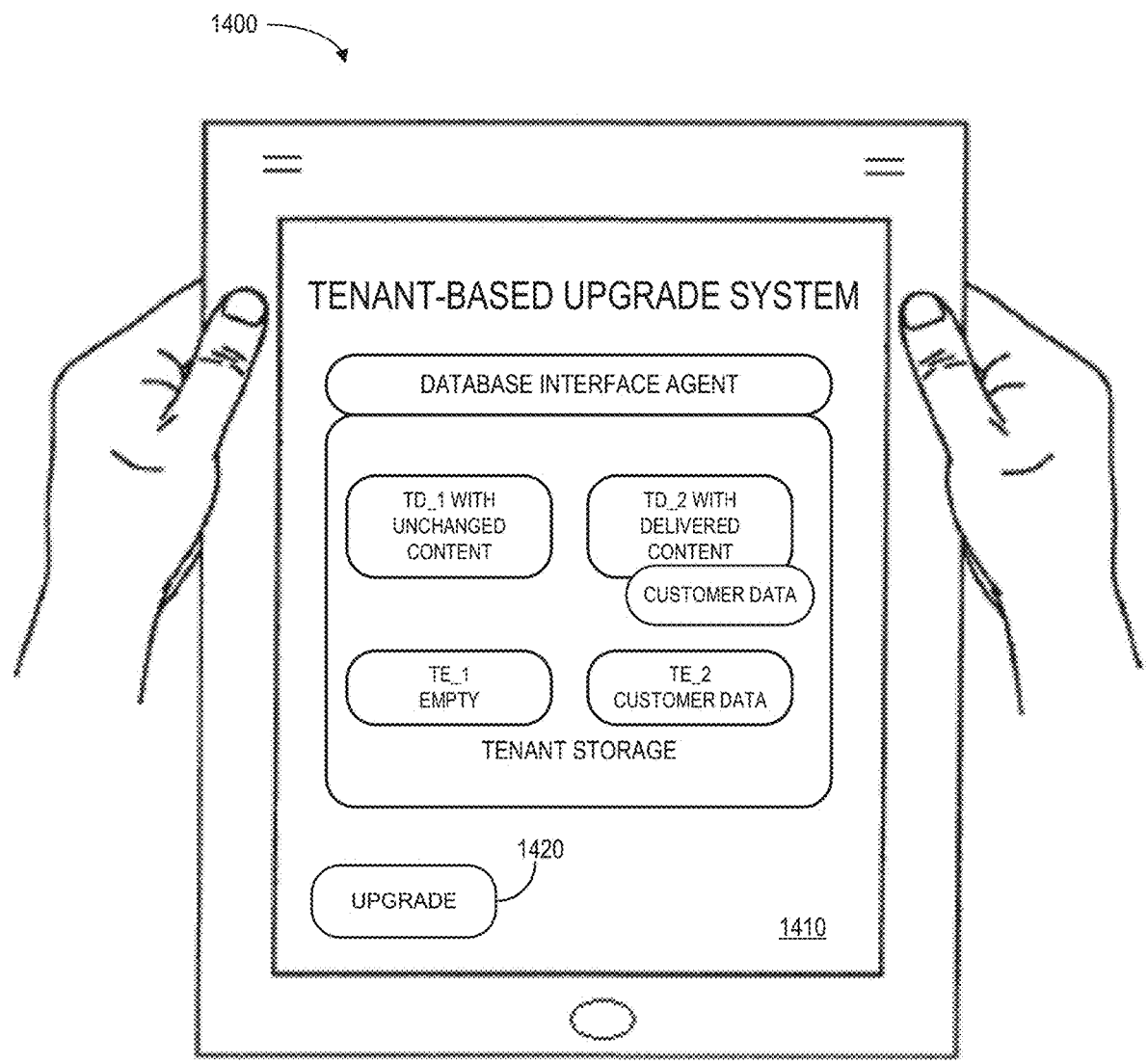
FIG. 14 illustrates a tablet computer displaying an interactive graphical user interface in accordance with some embodiments.

According to some embodiments, the elements of the system 200 support interactive user interface displays over a distributed communication network. For example, FIG. 13 illustrates a computer 1300 displaying an interactive graphical user interface 1310 according to some embodiments. In particular, the display 1310 includes a graphical overview of elements of a tenant-based upgrade system. Moreover, an icon 1320 may be selected via a computer mouse pointer to initiate an upgrade process. As another example, FIG. 14 illustrates a tablet computer 1400 displaying an interactive graphical user interface 1410 according to some embodiments. In particular, the display 1410 includes on overview of a tenant-based up system. Moreover, the touchscreen of the tablet 1400 may be used to select an icon 1412 that initiates an upgrade procedure.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A tenant-based upgrade system, comprising:
   a shared storage data store containing a first version of entities with original content;
   a local tenant storage data store to contain information associated with a tenant's application server; and
   a database interface agent, in communication with the application server and the local tenant storage data store, having a computer memory and processor adapted to perform the following method:
   entering a copy-on-access mode such that:
     as the application server accesses a sub-set of the first version of entities, the sub-set is migrated from the shared storage data store to the local tenant storage data store, and associated materialization flags are maintained indicating that the sub-set has been migrated,
     as the application server writes customer data into some of the sub-set of the first version of entities, modification flags are maintained indicating that those entities have received customer data, and
   initiating an upgrade process to install a second version of entities from the shared storage data store, wherein the first version of the entities is utilized by the application server during the upgrade process,
   entering a copy-on-write mode such that:
     as the application server accesses an additional sub-set of the first version of entities, the addition sub-set is not migrated from the shared storage data store to the local tenant storage data store, and associated materialization flags are not maintained, as the application server writes customer data into some of the first version of entities, modification flags are maintained indicating that those entities have received customer data, deleting, from the local tenant storage data store, entities having flags that indicate the entity was migrated but did not receive customer data, updating the structure of the entities remaining in the local tenant storage data store in view of a structure of the second version of the entities, and updating the content of the entities remaining in the local tenant storage data store in view of content of the second version of the entities and customer data previously written by the application server into some of the sub-set of the first version of entities.

2. The tenant-based upgrade system of claim 1, wherein the entities comprise at least one of: (i) tables, (ii) objects, (iii) containers (iv) views, and (v) procedures.

3. The tenant-based upgrade system of claim 2, wherein a plurality of tenants are supported, each associated with its own application server and local tenant storage data store.

4. The tenant-based upgrade system of claim 1, wherein an access of an entity by the application server comprises at least one of: (i) a read operation and (ii) a write operation.

5. The tenant-based upgrade system of claim 1, wherein an entity in the local tenant storage data store may receive customer data via at least one of: (i) an insert operation, (ii) a delete operation, and (iii) an update operation.

6. The tenant-based upgrade system of claim 1, wherein the method performed by the database interface agent further comprises:

upon completion of the upgrade process, arranging for the application server to utilize the second version of entities.

7. The tenant-based upgrade system of claim 1, wherein the method performed by the database interface agent further comprises:

upon initiation of the upgrade process, analyzing the entities to determine which entities need to be upgraded, and as part of completion of the upgrade process, comparing content of entities modified during the upgrade process with the second version of the entities and, if the content is identical, deleting the first version of the entity from the local tenant storage data store.

8. The tenant-based upgrade system of claim 1, wherein the database interface agent comprises one of: (i) an integral part of a database, or (ii) a separate component associated with the application server.

9. The tenant-based upgrade system of claim 8, wherein the database interface agent comprises a separate component that detects an error message when a statement attempts to access an entity that is missing from the local tenant storage data store, rolls back execution, analyzes the error message looking for the missing entity, copies the missing entity into the local tenant storage data store, and re-executes the statement.

10. The tenant-based upgrade system of claim 9, wherein the database interface agent repeats the process iteratively until the statement is successfully executed.

11. A computer-implemented tenant-based upgrade method associated with a system having a shared storage data store containing a first version of entities with original content and a local tenant storage data store to contain information associated with a tenant's application server, comprising:

entering, by a computer processor of a database interface agent, a copy-on-access mode such that:

as an application server accesses a sub-set of the first version of entities, the sub-set is migrated from the shared storage data store to the local tenant storage data store, and associated materialization flags are maintained indicating that the sub-set has been migrated, as the application server writes customer data into some of the sub-set of the first version of entities, modification flags are maintained indicating that those entities have received customer data;

initiating, by the computer processor of the database interface agent, an upgrade process to install a second version of entities from the shared storage data store, wherein the first version of the entities is utilized by the application server during the upgrade process;

entering, by the computer processor of the database interface agent, a copy-on-write mode such that:

as the application server accesses an additional sub-set of the first version of entities, the addition sub-set is not migrated from the shared storage data store to the local tenant storage data store, and associated materialization flags are not maintained, as the application server writes customer data into some of the first version of entities, modification flags are maintained indicating that those entities have received customer data;

deleting, from the local tenant storage data store by the computer processor of the database interface agent, entities having flags that indicate the entity was migrated but did not receive customer data;

updating, by the computer processor of the database interface agent, the structure of the entities remaining in the local tenant storage data store in view of a structure of the second version of the entities; and updating the content of the entities remaining in the local tenant storage data store in view of content of the second version of entities and customer data previously written by the application server into some of the sub-set of the first version of entities.

12. The tenant-based upgrade method of claim 11, wherein the entities comprise at least one of: (i) tables, (ii) objects, (iii) containers, (iv) views, and (v) procedures.

13. The tenant-based upgrade method of claim 12, wherein a plurality of tenants are supported, each associated with its own application server and local tenant storage data store.

14. The tenant-based upgrade method of claim 11, wherein an access of an entity by the application server comprises at least one of: (i) a read operation and (ii) a write operation.

15. The tenant-based upgrade method of claim 11, wherein an entity in the local tenant storage data store may receive customer data via at least one of: (i) an insert operation, (ii) a delete operation, and (iii) an update operation.

16. The tenant-based upgrade method of claim 11, further comprising:

upon completion of the upgrade process, arranging for the application server to utilize the second version of entities.

17. A non-transitory, computer-readable medium storing program code associated with a system having a shared storage data store containing a first version of tables with original content and a local tenant storage data store to contain information associated with a tenant's application server, the program code executable by a processor of a database interface agent to cause the processor to perform a tenant-based upgrade method comprising:

entering a copy-on-access mode such that:
        as an application server accesses a sub-set of the first version of tables, the sub-set is migrated from the shared storage data store to the local tenant storage data store, and associated materialization flags are maintained indicating that the sub-set has been migrated,
        as the application server writes customer data into some of the sub-set of the first version of tables, modification flags are maintained indicating that those tables have received customer data;
    initiating, by the computer processor of the database interface agent, an upgrade process to install a second version of tables from the shared storage data store, wherein the first version of the tables is utilized by the application server during the upgrade process;
    entering a copy-on-write mode such that:
        as the application server accesses an additional sub-set of the first version of tables, the addition sub-set is not migrated from the shared storage data store to the local tenant storage data store, and associated materialization flags are not maintained,
        as the application server writes customer data into some of the first version of tables, modification flags are maintained indicating that those tables have received customer data;
    deleting, from the local tenant storage data store, tables having flags that indicate the table was migrated but did not receive customer data;
    updating the structure of the tables remaining in the local tenant storage data store in view of a structure of the second version tables; and
    updating the content of the tables remaining in the local tenant storage data store in view of content of the second version of tables and customer data previously written by the application server into some of the sub-set of the first version of tables.

18. The medium of claim 17, wherein a plurality of tenants are supported, each associated with its own application server and local tenant storage data store.

19. The medium of claim 17, wherein an access of a table by the application server comprises at least one of: (i) a read operation and (ii) a write operation.

20. The medium of claim 17, wherein a table in the local tenant storage data store may receive customer data via at least one of: (i) an insert operation, (ii) a delete operation, and (iii) an update operation.

* * * * *